Feb. 10, 1953        J. P. FAZAKERLEY        2,628,054
CUP HOLDER
Filed June 5, 1950
FIG. 1.
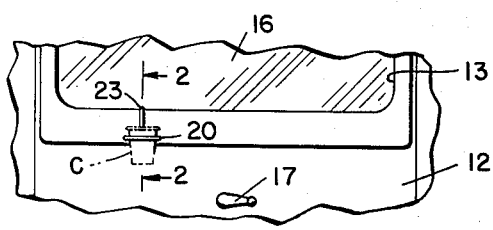
FIG. 2.
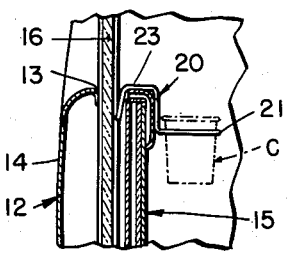
FIG. 3.
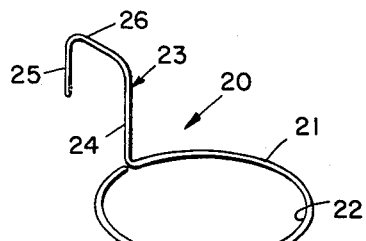
FIG. 4.
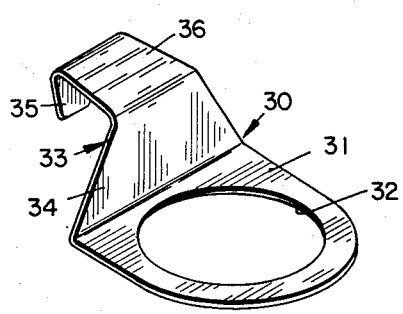
FIG. 5.
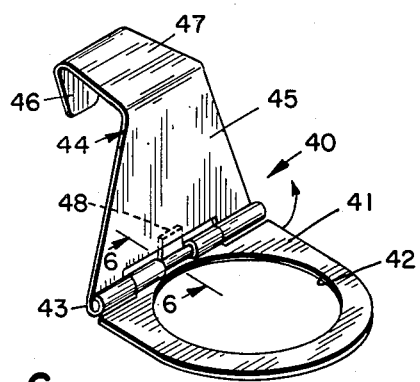
FIG. 7.      FIG. 8.
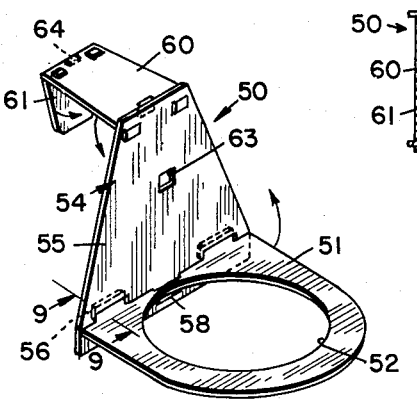
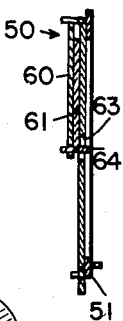
FIG. 6.
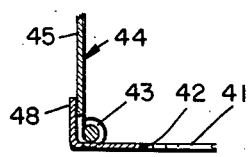
FIG. 10.
FIG. 9.
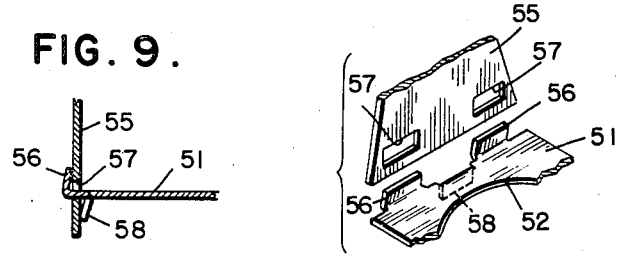
INVENTOR
JACK P. FAZAKERLEY
BY
*Mason & Graham*
ATTORNEYS Patented Feb. 10, 1953

2,628,054

UNITED STATES PATENT OFFICE 2,628,054

CUP HOLDER

Jack P. Fazakerley, Los Angeles, Calif.

Application June 5, 1950, Serial No. 166,147

1 Claim. (Cl. 248—311)

This invention has to do with a cup or drinking receptacle holder adapted to be detachably supported on an automobile door or the like.

An object of the invention is to provide a novel holder or bracket of simple construction for supporting a cup, drinking receptacle, or the like on the door of an automobile.

Another object is to provide a device of the type indicated which readily hooks over the door of an automobile in the window framing portion thereof for convenient use and which can readily be removed from the door after use.

A further object is to provide a cup holder or bracket for use as indicated which may be folded flat or collapsed when not in use.

Still another object is to provide a device of the type indicated which can be easily and cheaply manufactured.

These and other objects will be apparent from the drawing and the following description.

Referring to the drawing:

Fig. 1 is a fragmentary elevational view of the interior of an automobile door showing the device of the invention attached to the door;

Fig. 2 is a section on line 2—2 of Fig. 1;

Fig. 3 is a perspective view of one form of the invention;

Fig. 4 is a perspective view of another form of the invention;

Fig. 5 is a perspective view of still another form of the invention;

Fig. 6 is a section on line 6—6 of Fig. 5;

Fig. 7 is a perspective view of a modified form of the invention;

Fig. 8 is a central sectional view through the device of Fig. 7 when collapsed;

Fig. 9 is a section on line 9—9 of Fig. 7; and

Fig. 10 is a fragmentary view of the hinged connection between two of the parts of Fig. 7.

More particularly describing the invention, numeral 12 generally indicates the door of an automobile in which there is a window 13. The door includes an outer panel 14 and an inner panel structure 15 and between these, a glass pane 16 which is raised and lowered by crank 17 through conventional means.

The device of my invention is adapted to be hung on the door in the opening 13 upon the inner panel structure 15 of the door. Referring particularly to Figs. 1–3, one form of the invention consists of a wire bracket, generally indicated by 20, which is formed to provide a flat, circular portion 21 which may be termed a cup-holding portion, and this defines a cup-receiving opening 22 adapted to receive a cup C such as that shown in broken lines in Figs. 1 and 2. Extending from the cup-holding portion is a hook portion 23 which is somewhat J-shaped, including a long leg 24, a short leg 25, and an intermediate leg 26. While described as being J-shaped, the portion 23 may well be U-shaped.

It will be apparent that in use the hook portion 23 is placed over the section 15 of the door so that the short leg 25 is between the section 15 and the glass 16 as shown in Fig. 2. The device in this position readily accommodates and holds a paper cup or other receptacle.

In Fig. 4 I show another form of the invention wherein a bracket 30 is provided formed of flat stock, which may be metal, molded plastic, or other desired material. In this form of the invention the cup-holding portion, indicated by 31, is flat and defines a cup-receiving opening 32. This device also has a hook-like portion 33 consisting of a long leg 34, a short leg 35, and an intermediate connecting portion 36. The leg 34 extends substantially at right angles to the portion 31 and the parts 35 and 36 are respectively at right angles to each other and part 34.

It will be apparent that this device is used in the same manner as that previously described.

In Fig. 5 I show another form wherein the device is partially collapsible. Referring to this figure, numeral 40 generally indicates the bracket which includes a cup-holding member 41 defining a cup-receiving opening 42. Hingedly connected at 43 to member 41 is a hook member 44 which I have shown as being of flat stock bent or formed to provide a somewhat inverted J-shaped hook consisting of a long leg 45, a short leg 46, and an intermediate section 47.

Suitable means are provided for limiting the pivotal movement of the parts at the hinge 43 so that while member 41 may be folded flat against the section 45 it cannot be pivoted more than about 90° thereto. The stop means, shown for accomplishing this, comprises a tab 48 formed on the member 41 and adapted to abut the member 45 as shown in Fig. 6.

In Fig. 7 I show a completely collapsible bracket, indicated generally by 50. This bracket includes a cup-holding member 51 having a cup-receiving opening 52 therein. Three plates are hingedly mounted to each other, and one of them to the member 51 for the purpose of providing a hook portion, indicated by 54. The first of these plates, 55, is hingedly connected to plate 51 by tabs 56 on member 51, and slots 57 in member 55. A stop tab 58 on member 51 is provided for limiting movement of the parts beyond that shown in Fig. 7. A plate 60 is pivotally connected to the plate 55 by a type of hinge means similar to that connecting plates 51 and 55. In like manner a plate 61 is also connected to plate 60.

The device shown in Fig. 7 may be completely collapsed to the position in which it is shown in Fig. 8 by pivoting member 61 flat against the section 60 and by pivoting both of these together against the outer side of the plate 55. The plate 55 is provided with an opening 63 for the purpose of receiving the central tab 64 at the hinge between members 60 and 61 as shown in Fig. 8. The member 51 may be pivoted to lie flat against the inner side of member 55.

Although the invention has been particularly shown and described, it is contemplated that various changes and modifications can be made without departing from the scope thereof as indicated by the following claim.

I claim:

A collapsible cup-holding bracket, comprising a plate-like cup-holding member having a cup-receiving opening therein, and a hook portion including a first plate hingedly connected at one end to an edge of said cup-holding member, a second plate hingedly mounted at the end of said first plate opposite the end connected to said cup-holding portion, and a third plate hingedly connected to said second plate at the end thereof opposite the end connected to said first plate, and stop means in said hinge connections limiting pivotal movement of each of said plates at each hinge to about 90° from a collapsed position in which said cup-holding member is against one side of said first plate and said second and third plates against the other side of said first plate with said third plate between said first and second plates.

JACK P. FAZAKERLEY.

REFERENCES CITED

The following references are of record in the file of this patent:

UNITED STATES PATENTS

| Number | Name | Date |
|---|---|---|
| 1,915,958 | Skirrow | June 27, 1933 |
| 2,074,248 | Barbour | Mar. 16, 1937 |
| 2,215,411 | Sebring | Sept. 17, 1940 |
| 2,279,442 | Burns et al. | Apr. 14, 1942 |
| 2,289,701 | Engel et al. | July 14, 1942 |